United States Patent [19]

Kayane et al.

[11] Patent Number: 4,548,612
[45] Date of Patent: Oct. 22, 1985

[54] HALO-TRIAZINE AND VINYLSULFONE REACTIVE DYE COMPOSITION WITH BUFFER FOR STORAGE STABILITY

[75] Inventors: Yutaka Kayane; Naoki Harada, both of Ibaraki, Japan

[73] Assignee: Sumitomo Chemical Company, Limited, Osaka, Japan

[21] Appl. No.: 611,889

[22] Filed: May 18, 1984

[30] Foreign Application Priority Data

May 27, 1983 [JP] Japan ................................. 58-94469

[51] Int. Cl.⁴ .............................................. C09B 67/24
[52] U.S. Cl. ............................................ 8/524; 8/527; 8/528; 8/549; 8/688; 8/918
[58] Field of Search .................... 8/524, 527, 549, 528

[56] References Cited

U.S. PATENT DOCUMENTS

| | | | |
|---|---|---|---|
| 4,072,463 | 2/1978 | Schlafer et al. | 8/527 |
| 4,118,184 | 10/1978 | Opitz et al. | 8/527 |
| 4,378,313 | 3/1983 | Kayane et al. | 260/153 |
| 4,384,868 | 5/1983 | Sunami et al. | 8/524 |

FOREIGN PATENT DOCUMENTS

| | | |
|---|---|---|
| 838337 | 6/1960 | United Kingdom . |
| A880393 | 10/1961 | United Kingdom . |
| 1494161 | 12/1977 | United Kingdom . |

*Primary Examiner*—A. Lionel Clingman
*Attorney, Agent, or Firm*—Stevens, Davis, Miller & Mosher

[57] ABSTRACT

A reactive dye composition comprising (1) a dye having the formula,

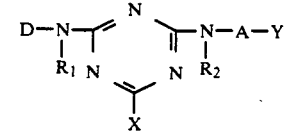

wherein D is an organic dye residue having at least one sulfo group, $R_1$ and $R_2$ are independently a hydrogen atom or an unsubstituted or substituted lower alkyl group, A is an unsubstituted or substituted phenylene or naphthylene group, X is a halogen atom, and Y is a group, $-SO_2CH=CH_2$ or $-SO_2CH_2CH_2Z$, in which Z is a group capable of being split by the action of an alkali, and (2) a buffer, the amount of the buffer being from 3 through 80% by weight based on the weight of the dye, and the pH value of an aqueous solution prepared from the dye composition and water of 20 times as much as the weight of the dye composition being from 3.5 through 7.5, which is superior in storage stability, and useful for dyeing or printing fiber materials to give dyed or printed products having superior fastness with high reproducibility.

10 Claims, No Drawings

HALO-TRIAZINE AND VINYLSULFONE REACTIVE DYE COMPOSITION WITH BUFFER FOR STORAGE STABILITY

The present invention relates to a reactive dye composition. More specifically, the invention relates to a difunctional reactive dye-containing composition improved in a storage stability.

Reactive dyes are used for dyeing fiber materials usually after having been stored for several days to several months, during which fiber-reactive groups appended to the dye molecule are easy to be hydrolyzed due to water contained in a dye product and air. Therefore, there are often caused troubles such that the reactive dyes are deteriorated in their dyeability, when used for dyeing fiber materials. As well known, the hydrolysis degree of the fiber-reactive groups varies depending on the kind of fiber-reactive groups and pH value. For example, reactive dyes having a halogenotriazinyl group are easy to be hydrolyzed within an acid region, whereas stable within a neutral or alkali region, and reactive dyes having a so-called vinylsulfone type reactive group are easy to be hydrolyzed within an alkali region, whereas stable within an acid region. For the reasons described above, in order to improve the storage stability of this kind of the reactive dyes, the reactive dyes having a halogenotriazinyl group are incorporated with a buffer exhibiting a pH value of from about 8 to 10, and the socalled vinylsulfone type reactive dyes are incorporated with a buffer exhibiting a pH value of from about 3 to 4.

However, in the case of difunctional reactive dyes having both the halogenotriazinyl group, and the so-called vinylsulfone type reactive group, which have been largely used for dyeing fiber materials because of their excellent dye performances, it is hard to improve the storage stability on the basis of the above prior knowledge, because the halogenotriazinyl group and the vinylsulfone type reactive group are easy to be hydrolyzed within both the acid and alkali regions, respectively. Thus, according to the lapse of time during the storage of this kind of difunctional reactive dyes, there are often caused troubles such as decrease in the dyeability, change in the color, decrease in the reproducibility and the like, and it has been desired eagerly to improve the storage stability.

The present inventors have undertaken extensive studies to improve the storage stability of such kind of difunctional reactive dyes, and as a result found that the storage stability can be markedly improved by providing a dye composition comprising a difunctional reactive dye and a buffer, the amount of the buffer being a limited one and the pH value of an aqueous solution of the dye composition being within a specific range.

The present invention relates to a reactive dye composition comprising (1) a dye having the formula (I),

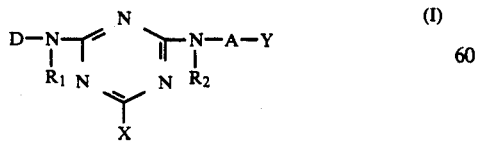

wherein D is an organic dye residue having at least one sulfo group, $R_1$ and $R_2$ are independently a hydrogen atom or an unsubstituted or substituted lower alkyl group, A is an unsubstituted or substituted phenylene or naphthylene group, X is a halogen atom, and Y is a group, $-SO_2CH=CH_2$ or $-SO_2CH_2CH_2Z$, in which Z is a group capable of being split by the action of an alkali, and (2) a buffer, the amount of the buffer being from 3 through 80% by weight based on the weight of the dye, and the pH value of an aqueous solution prepared from the dye composition and water of 20 times as much as the weight of the dye composition being from 3.5 through 7.5. The invention also provides a method for dyeing or printing fiber materials, which comprises contacting the fiber materials with the dye composition defined above at a temperature of 10° to 170° C. in the presence of an acid binding agent.

In the dye of the formula (I), the organic dye residue having at least one sulfo group represented by D includes, for example, residues of monoazo, disazo, trisazo, anthraquinone, phthalocyanine, metal complex azo, formazan, azomethine, dioxazine and phenazine dyes.

The substituent which may be appended to the lower (e.g. $C_1$ to $C_4$) alkyl group represented by $R_1$ and $R_2$ includes, for example, hydroxy, cyano, alkoxy, halogen, carboxy, carbamoyl, alkoxycarbonyl, alkylcarbonyloxy, sulfo and sulfamoyl.

The substituent which may be appended to the phenylene and naphthylene groups represented by A includes, for example, methyl, ethyl, methoxy, ethoxy, chlorine, bromine, carboxy and sulfo.

The halogen atom represented by X includes preferably chlorine and bromine.

The group capable of being split by the action of an alkali represented by Z includes, for example, sulfuric acid ester, thiosulfuric acid ester, phosphoric acid ester and acetic acid ester groups and halogen atoms.

The dye of the formula (I) can be prepared, briefly speaking, in the following manner.

A compound represented by the following formula (II),

wherein D and $R_1$ are as defined above, is condensed with a trihalogenotriazine represented by the following formula (III),

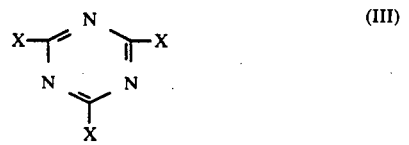

wherein X is as defined above, followed by condensation with an amine represented by the following formula (IV),

wherein $R_2$, A and Y are as defined above, or the amine of the formula (IV) is condensed with the trihalogenotriazine of the formula (III), followed by condensation with the compound of the formula (II).

More concretely, examples of the dye having the formula (I) and methods for production of the dyes are disclosed, for example, Published Examined Japanese Patent Application Nos. 18184/1964 and 39672/1980, and Published Unexamined Japanese Patent Application Nos. 163276/1980, 4783, 9483, 14654, 15481, 37379, 59870, 91082, 91083, 92961, 97262, 103247, 103249, 103428, 112584, 118975, 118976, 123483, 123484, 128373, 128375, 128376, 128377, 128378, 128380, 128381, 134279, 140185, 143573, 159373 and 163153/1981, 2365, 42985, 42986, 49663, 57754, 87467, 89679, 92054, 121058, 139580, 141455, 13360, 143572, 143574, 143575, 143576, 143581, 187362, 187363, 187364, 187358, 192467 and 198758/1982, and 37057/1983.

The buffers usable in the present invention are those which are inert to both the fiber-reactive groups, and include, for example, sodium dihydrogenphosphate, disodium hydrogenphosphate, potassium dihydrogenphosphate, dipotassium hydrogenphosphate, sodium acetate, potassium acetate, sodium borate, potassium borate, sodium oxalate, potassium oxlate, potassium hydrogenphthalate and the like. Of these, particularly preferred are sodium dihydrogenphosphate, disodium hydrogenphosphate, sodium acetate and sodium borate. These buffers may be used each alone or in admixture of two or more.

The buffer is used in an amount of 3 to 80% by weight, preferably 5 to 50% by weight, based on the weight of the dye having the formula (I).

The dye composition in accordance with the present invention is prepared so as to show a pH ranging from 3.5 through 7.5, preferably from 4.5 through 6.5, when dissolved in water of 20 times as much as the weight of the dye composition.

The dye composition may additionally contain inorganic neutral salts such as anhydrous sodium sulfate, sodium chloride, potassium chloride and the like, and/or dispersing agents.

The dye composition of the present invention can be prepared, for example, by mixing the dye of the formula (I) in the form of an aqueous solution, a slurry or a wet or dry cake with at least one buffer described above, adjusting the pH of the resulting mixture within the specified range in the manner as defined above, and then drying it, if necessary.

More concretely speaking, immediately after the production of the dye of the formula (I) usually in the form of aqueous solution or slurry, the buffer is added thereto at a temperature ranging from about 0° to 80° C., preferably from about 10° to 60° C. The resulting mixture may be admixed with an alkali such as sodium carbonate, potassium carbonate, sodium hydrogencarbonate, sodium hydroxide, potassium hydroxide and the like when the pH of the mixture is lower than 3.5, or with an acid such as hydrochloric acid, sulfuric acid, hydrobromic acid and the like when the pH of the mixture is higher than 7.5, in order to adjust the pH within a range of from 3.5 through 7.5.

The thus prepared mixture may be dried by means of a spray drier, flash drier, grooved drier, band drier, drum drier, kneading drier and the like. Then, the inorganic neutral salts and/or dispersing agents shown above may be added as a diluent. Thus, a desired composition can be obtained.

Alternatively, immediately after the production of the dye of the formula (I) in the form of aqueous solution, an electrolyte such as sodium chloride, potassium chloride, sodium sulfate and the like may be added thereto for the salting-out, followed by filtration to obtain a wet cake. The wet cake is mixed with water to form an aqueous solution or slurry, which is then treated in the same manner as described above, thereby obtaining the desired dye composition, or the wet cake may be kneaded with the buffer, followed by drying to obtain the desired composition.

The desired dye composition may be also obtained by mixing the dye of the formula (I) in a dry state with the buffer.

The dye composition thus obtained has an excellent storage stability, and is unchangeable even after storage for a long period of time or even after storage at a relatively high temperature. For example, after storage for 12 months at ambient temperatures or for 1 month in an atmosphere of 60° C., the dye composition can give a dyed or printed product, which is equal in the color shade and color depth to that obtained using the dye composition immediately after the preparation.

Moreover, the dye composition in accordance with the present invention has an excellent water solubility, shows no aggregation even in an alkaline solution during the dyeing and can give a dyed or printed product having a levelling property with a high reproducibility.

The dye composition of the present invention is useful for dyeing fiber materials, particularly hydroxyl group-containing fiber materials.

The hydroxyl group-containing materials include natural and synthetic hydroxyl group-containing fiber materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

These fiber materials may be dyed or printed by an exhaustion dyeing, padding including cold-pad-batch-up method or printing, from which a suitable one may be chosen depending on the property or physical form of the fibers.

In general, the dyeing or printing may be carried out at a temperature of 10° to 170° C. and at a pH of 10 or higher in the presence of an acid binding agent.

More concretely speaking, the exhaustion dyeing may be carried out at a temperature of 30° to 100° C., preferably 50° to 70° C. using a dye bath containing an acid binding agent and if desired, a neutral salt such as sodium sulfate and sodium chloride, and additives such as dissolution assistants, penetrants and level dyeing agents. The neutral salt capable of promoting the exhaustion of the compound into the fiber materials may be added after or/and before the temperature of the dye bath reaches a desired level for the dyeing.

The padding may be carried out by applying a padding solution to the fiber material at ambient or elevated temperatures, drying the padded materials and then steaming or dry-heating the same to effect the fixation.

The printing may be carried out in a one-phase manner wherein the fiber materials may be printed with a printing paste containing an acid binding agent, followed by steaming at a temperature of 100° to 160° C., or a two-phase manner wherein the fiber materials may be printed with a neutral or weakly acidic printing paste, followed by passing through a hot alkaline bath containing an electrolyte, or over-padding with an alkaline padding solution containing an electrolyte, and then subjected to steaming or dry-heating. The printing paste may be prepared in a conventional manner using a thickener such as sodium alginate and starch ether and an emulsifier, if desired, along with conventional printing assistants such as urea, dispersing agents and the like.

The acid binding agent useful for fixing the dye of the formula (I) to the cellulose fiber materials includes water-soluble basic salts such as alkali or alkaline earth metal salts of inorganic or organic acids and compound capable of liberating alkalis under heating conditions. Preferred are alkali metal hydroxides and alkali metal salts of inorganic or organic acids having a weak or medium strength. Particularly preferred are sodium and potassium salts. Examples thereof are sodium hydroxide, potassium hydroxide, sodium carbonate, sodium hydrogencarbonate, sodium formate, potassium carbonate, mono, di or trisodium phosphate, sodium silicate, sodium trichloroacetate and the like.

The dye composition of the present invention can give remarkable advantages in the dyeing or printing fiber materials. Particularly when used for dyeing or printing cellulose fiber materials, the present compound can exhibit excellent build-up, level-dyeing and washing-off properties along with high exhaustion and fixation percentages, and give a dyed or printed product excellent in light fastness, perspiration-light fastness, abrasion fastness, wet fastness such as washing resistance, chlorine-containing water resistance, chlorine-bleaching resistance, alkali resistance, perspiration resistance and peroxide-washing resistance, acid-hydrolysis fastness and iron fastness.

Moreover, the dye composition of the present invention can exhibit a high solubility and give a dyed or printed product constant in the quality irrespective of change in the dyeing temperature or bath ratio.

The present invention is illustrated in more detail with reference to the following Examples, which are only illustrative of the present invention. In Examples, parts and % are by weight, unless otherwise specified.

EXAMPLE 1

A mixture of disodium 2-aminonaphthalene-3,6,8-trisulfonate (8.5 parts) with water (100 parts) was made into a solution by the addition of aqueous sodium hydroxide solution to adjust the pH to 8. The solution was mixed with sodium nitrite (1.4 parts) and then cooled to a temperature of between 0° and 5° C. Concentrated hydrochloric acid (6.1 parts) was added thereto, and the mixture was stirred for 30 minutes at that temperature. Excess nitrous acid present therein was decomposed in a conventional manner. The resulting paste-like mixture was added at a temperature of between 0° and 5° C. to a solution prepared by dissolving m-acetylaminoaniline (3.3 parts) in water (80 parts by volume). The coupling reaction was discontinued by adjusting the pH to a value of between 3 and 5. The reaction mixture was made into a solution by adjusting the pH to 8, and sodium chloride (40 parts) was added to the solution to deposit crystals. The crystals were collected on a suction filter, washed and again dissolved in water (100 parts). The solution was adjusted to a pH of between 6 and 7, and then mixed with cyanuric chloride (3.3 parts). The mixture was stirred for 5 hours at a temperature of between 20° and 25° C., while adding a 20% aqueous sodium carbonate solution to adjust the pH to between 5 and 6.

Successively, 1-aminobenzene-4-β-sulfatoethylsulfone (5.6 parts) was added to the above reaction mixture, and the resulting mixture was heated to 40° C. while adding a 20% aqueous sodium carbonate solution to adjust the pH to between 5 and 6, stirred for 5 hours at this temperature and at this pH. Thus, a solution of a dye having the following formula (1),

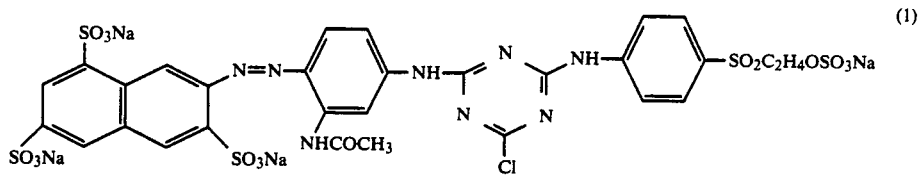

(dye content 17 parts) was obtained.

This solution was mixed with sodium dihydrogenphosphate dihydrate (2.8 parts), and the mixture was adjusted to pH 5.5 by the addition of a 20% sodium carbonate solution, and then spray-dried to obtain a yellow dye composition having an excellent storage stability. Even after storage for one month at 60° C., the dye composition was able to give both dyed and printed products which were equal in the color shade and color depth to the products obtained using the dye composition immediately after the preparation.

On the other hand, in the case of using no buffer, the dye after having been stored for one month at 60° C. only gave both dyed and printed products of a half color depth and a dark reddish color, as compared with those obtained using the dye immediately after the production.

EXAMPLE 2

To a suspension of cyanuric chloride (9.2 parts) in ice water was added a neutral solution of 4-amino-8-hydroxy-2,7-naphthalene disulfonic acid (15.9 parts), and the mixture was stirred for 5 hours under cooling while controlling the pH to 3 or below with a 20% aqueous sodium carbonate solution. The temperature of the reaction mixture was then raised to 20° C., and 3-aminophenyl-β-sulfatoethylsulfone (15 parts) was added thereto. The mixture was heated to 30° C. while controlling the pH to 5 with a 20% aqueous sodium carbonate solution, and then kept for 5 hours at that temperature under stirring. Then, the reaction mixture was cooled to 10° C. or below.

On the other hand, a suspension (150 parts) comprising 2-amino-1,5-naphthalenedisulfonic acid (15 parts) and hydrochloric acid (10 parts) was cooled to 10° C. or below, and a solution of sodium nitrite (3.5 parts) in water (10 parts) was added to the above suspension. The mixture was stirred for 3 hours at that temperature. Then, excess nitrous acid was decomposed to obtain a diazonium liquor.

The diazonium liquor was added to the aforesaid reaction mixture, and the mixture was stirred for 5 hours, while keeping the temperature to 10° C. or below, and controlling the pH within a range of between of 6 and 7 with a 20% aqueous sodium carbonate solution.

Successively, the reaction mixture was heated to 40° C., and then mixed with sodium chloride (150 parts) to deposit crystals, which were collected on a filter. Thus, a wet cake containing a dye of the following formula (2), pH of between 7 and 8, while controlling the pH within a range of 5 to 6 with a 20% aqueous sodium carbonate solution. Thereafter, the mixture was stirred at a temperature of between 0° and 5° C. to complete the coupling reaction.

1-Aminobenzene-3-β-sulfatoethylsulfone (16.9 parts) was added to the above reaction mixture, and the result-

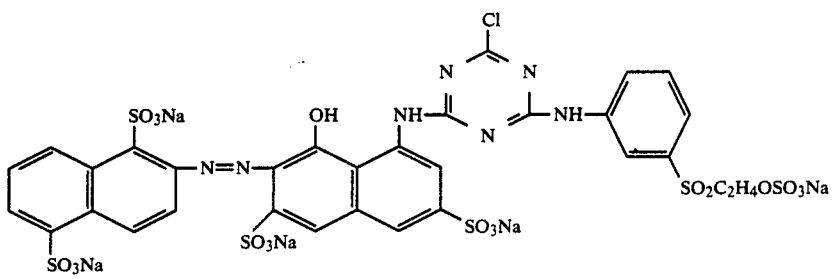

(2)

was obtained (dye content 45 parts).

The wet cake obtained was dissolved in water (400 parts) and then mixed with sodium dihydrogenphosphate dihydrate (18 parts). The mixture was adjusted to pH 5.5 with a 15% aqueous sodium carbonate solution, and then spray-dried to obtain a red dye composition.

After storage for one month at 50° C., the dye composition was able to give both dyed and printed products, which were equal in the color depth and color shade to those obtained using the dye composition immediately after the preparation.

On the other hand, in case of using no buffer, the dye after storage for one month at 50° C. only gave both dyed and printed products of a color depth decreased to 60% of the initials.

EXAMPLE 3

In a solution of a nonionic surfactant (0.1 part) in water (100 parts) was dispersed cyanuric chloride (9.2 parts) at a temperature of between 0° and 10° C. A solution of sodium 2,4-diaminobenzenesulfonate (10.5 parts) in water (100 parts) was dropwise added to the dispersion taking over one hour at a temperature of between 0° and 5° C.

After completion of the dropwise addition, the reaction mixture was adjusted to a pH of between 7 and 8 with a 20% aqueous sodium carbonate solution. Successively, sodium nitrite (3.5 parts) was added and dissolved in the reaction mixture, and then concentrated hydrochloric acid (12.7 parts) was added thereto at a temperature of between 0° and 5° C. to effect the diazotization. The resulting diazonium suspension was added at a temperature of between 0° and 5° C. to a solution prepared by dissolving 1-(4′,8′-disulfo-2′-naphthyl)-3-methylpyrazolone (19.2 parts) in water (150 parts) at a ing mixture was heated to 40° C. while controlling the pH within a range of 5 to 6, and stirred for 5 hours at this temperature, whereby a solution containing a dye of the following formula (3),

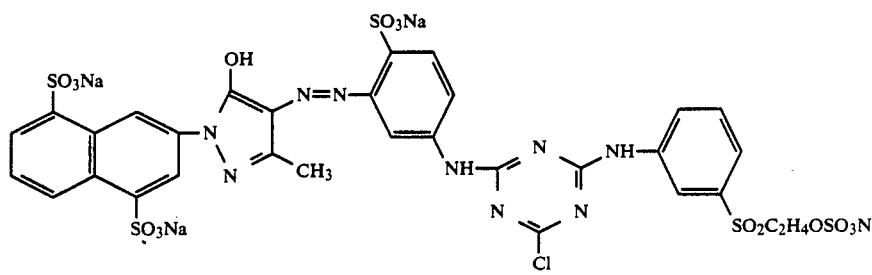

(3)

(dye content 43 parts) was obtained.

The solution was mixed with disodium hydrogenphosphate (7.1 parts), adjusted to pH 6.0 with 10% hydrochloric acid, and then spray-dried to obtain a yellow dye composition having an excellent storage stability.

EXAMPLE 4

A solution of m-phenylenediaminesulfonic acid (9.4 parts) in water (50 parts) was adjusted to pH 2.8±0.5 with hydrochloric acid, and then cooled to a temperature of between 0° and 5° C.

To this solution was added cyanuric chloride (9.5 parts) at 0° to 5° C. while controlling the pH within 2 to 3, and the mixture was kept for 1 hour at that temperature. Then, the temperature was raised to 30° to 35° C., and 1-aminobenzene-3-β-sulfatoethylsulfone (16.9 parts) was added thereto, and the mixture was kept for 4 hours at pH 4 to 5.

Sodium nitrite (3.5 parts) and concentrated hydrochloric acid (8.8 parts) were added to the above reaction mixture cooled to 0° to 5° C., and the mixture was stirred for one hour at that temperature. Excess nitrous acid present was decomposed, and the resulting paste-like liquor was added at 0° to 5° C. to a solution prepared by dissolving 1-acetylamino-8-hydroxynaphthalene-3,6-disulfonic acid (16.5 parts) and sodium hydrogen-carbonate (2 parts) in water (200 parts). The mixture was stirred for 3 hours while controlling the pH within 5.5 to 6.5, whereby an aqueous solution of a dye having the following formula (4),

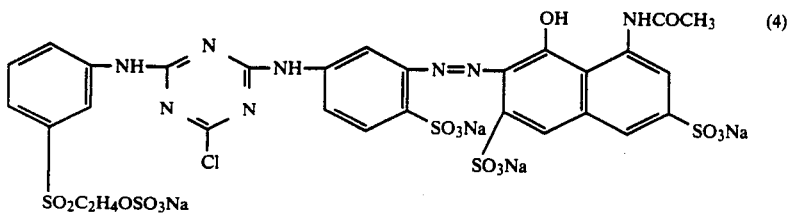

was obtained (dye content 40 parts).

The solution was mixed with sodium dihydrogenphosphate dihydrate (13 parts), and then spray-dried to obtain a red dye composition having an excellent storage stability.

EXAMPLE 5

In a solution of a nonionic surfactant (0.1 part) in water (100 parts) was dispersed cyanuric chloride (9.2 parts) at 0° to 5° C. A solution prepared by dissolving J acid (11.3 parts) in water (100 parts) at pH 7 to 8 was dropwise added to the dispersion taking over one hour at 0° to 5° C. Thereafter, the mixture was adjusted to pH 3 by the addition of a 20% aqueous sodium carbonate solution, and stirred for 2 hours. Successively, 1-N-ethylaminobenzene-3-β-sulfatoethylsulfone (16 parts) was added thereto, and the mixture was heated to 40° C. while controlling the pH within 5 to 6, and stirred for 2 hours at this temperature.

The reaction mixture was cooled to 0° to 5° C., and sodium hydrogencarbonate (12.6 parts) was added thereto. To this mixture was added at 0° to 5° C. taking over one hour a solution prepared by diazotizing 2-amino-5-methoxybenzenesulfonic acid (9.6 parts) in a conventional manner. The mixture was stirred for 2 hours at that temperature, then mixed with sodium dihydrogenphosphate dihydrate (7.8 parts), and adjusted to pH 5 with a 20% sodium carbonate solution. The resulting mixture was spray-dried to obtain a scarlet dye composition containing a dye of the following formula (5), (dye content 36 parts), and having an excellent storage stability.

The dye composition even after storage for 2 months at 60° C. was able to give both dyed and printed products, which were equal in the color depth and color shade to those of the initials.

EXAMPLE 6

A solution of disodium 1-amino-4-(3'-amino-2',4',6'-trimethyl-5'-sulfoanilino)anthraquinone-2-sulfonate (26.7 parts) in water (200 parts) was added to a dispersion of cyanuric chloride (9.3 parts) in ice water (75 parts) at 0° to 5° C. and at pH 6 to 7 taking over one hour, during which the pH decreasing with progress of the reaction was controlled within 6 to 7 by the addition of sodium carbonate. Thereafter, the mixture was stirred for one hour at 0° to 5° C. and at pH 6 to 7. Successively, 1-aminobenzene-3-β-sulfatoethylsulfone (14.1 parts) was added thereto, and the mixture was heated to 40° C., while controlling the pH within 5 to 6 using sodium carbonate, and stirred for 5 hours at that temperature. The reaction mixture was mixed with sodium chloride (50 parts) to deposit crystals, which were collected on a filter and washed.

The wet cake obtained was dissolved in water (400 parts) to form an aqueous solution containing a dye having the following formula (6),

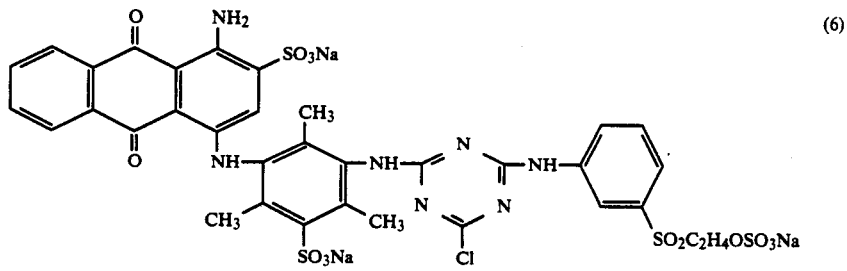

(dye content 45 parts). The solution was mixed with sodium acetate (3.2 parts), then adjusted to pH 6 with a 10% hydrochloric acid, and spray-dried to obtain a blue dye composition having an excellent storage stability.

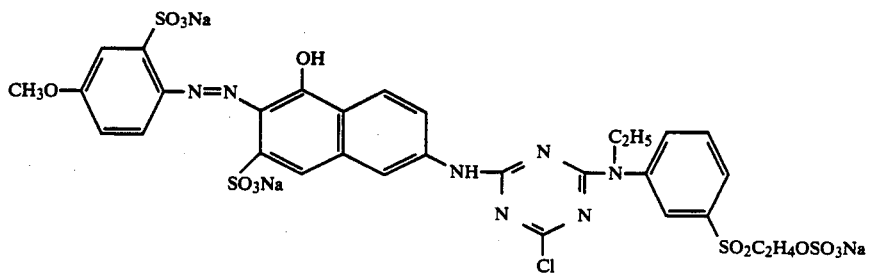

EXAMPLE 7

To ice water (25 parts) were added aniline-4-sulfonic acid (4.33 parts) and concentrated hydrochloric acid (3.7 parts), and then a 35% solution of sodium nitrite (5.1 parts) was added thereto at 0° to 5° C. to effect diazotization. Excess nitrous acid was decomposed. A neutral solution of monosodium 1-amino-8-hydroxynaphthalene-3,6-disulfonate (7.81 parts) was added to the diazonium liquor at 0° to 10° C. taking over one hour, and the coupling reaction was continued at pH 0.5 to 1.5. After stirring for several hours, the mixture was neutralized to pH 7 with sodium hydroxide solution, and then mixed at 30° to 35° C. with sodium chloride to salt out a monoazo dye.

On the other hand, cyanuric chloride (4.6 parts) and m-phenylenediaminesulfonic acid (4.70 parts) were mixed in an aqueous solution of a surfactant (50 parts), and the mixture was kept for 1 to 2 hours at 0° to 5° C. and at pH 6 to 7 to complete a first condensation. Successively, 1-aminobenzene-3-β-sulfatoethylsulfone (6.95 parts) was added to the first condensation mixture, and the mixture was stirred at 25° to 30° C. over night, while controlling the pH within 5 to 5.5, to complete a second condensation.

To the condensation mixture were added ice (50 parts), concentrated hydrochloric acid (7.1 parts) and then a 35% sodium nitrite solution (5.3 parts) to effect diazotization. Excess nitrous acid was decomposed to obtain a diazonium liquor. The liquor was added at 5° to 10° C. to a suspension of the above monoazo dye made alkaline with sodium hydrogencarbonate, and the mixture was stirred for 1 to 2 hours to obtain a slurry containing dye having the following formula (7), The dye composition even after storage for one month at 60° C. was able to give both dyed and printed products, which were equal in the color depth and color shade to those obtained using the composition immediately after the preparation.

EXAMPLE 8

A mixture of 2-carboxyphenylhydrazine-5-sulfonic acid (23.2 parts) and benzaldehyde (11.0 parts) in water (100 parts) was stirred at 55° C. over night to obtain the corresponding hydrazone compound. On the other hand, a solution comprising water (50 parts), 3-acetylamino-2-hydroxyaniline-5-sulfonic acid (24.6 parts) and concentrated hydrochloric acid (28.2 parts) was cooled to 0° to 10° C., and a solution of sodium nitrite (7.1 parts) in water (13 parts) was added thereto. The mixture was stirred for 1 to 2 hours at that temperature, and excess nitrous acid was decomposed to obtain a diazonium liquor. This liquor and the hydrozone compound obtained above were stirred at 0° to 5° C. in the presence of sodium carbonate until the diazonium compound disappeared. The thus formed formazane-containing mixture was adjusted to pH 5 to 6 with acetic acid, and then mixed with crystal copper sulfate (26.2 parts). The mixture was stirred for about 5 hours at 40° to 50° C. to form a copper complex compound, which was isolated through salting out with sodium chloride. The product was kept for about one hour at 90° C. in a 3% sodium hydroxide solution to hydrolyze the acetylamino group. The reaction mixture was adjusted to pH 3 to 4, and then mixed with cyanuric chloride (16.6 parts). The mixture was stirred for 3 hours at 0° to 5° C., while controlling the pH within 3 to 4 using a 20% aqueous sodium carbonate solution.

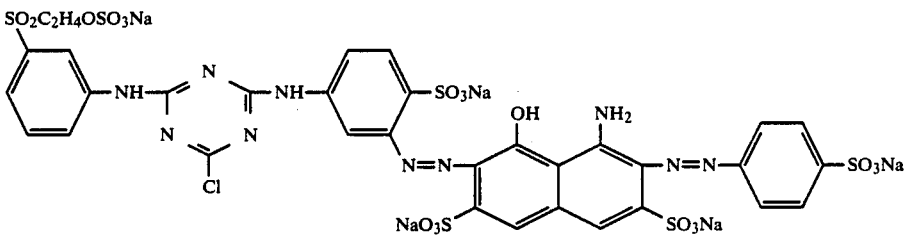

(7)

(dye content 26 parts).

The slurry was mixed with sodium dihydrogenphosphate dihydrate (3.9 parts), and the mixture was ventilation-dried at 60° C. to obtain a navy blue dye composition having an excellent storage stability.

Successively, 1-N-ethylaminobenzene-3-β-sulfatoethylsulfone (27.8 parts) was added thereto, and the mixture was heated to 40° C., while controlling the pH within 5 to 6 using a 20% aqueous sodium carbonate solution, and stirred for 6 hours at that temperature to obtain an aqueous solution containing a dye having the following formula (8),

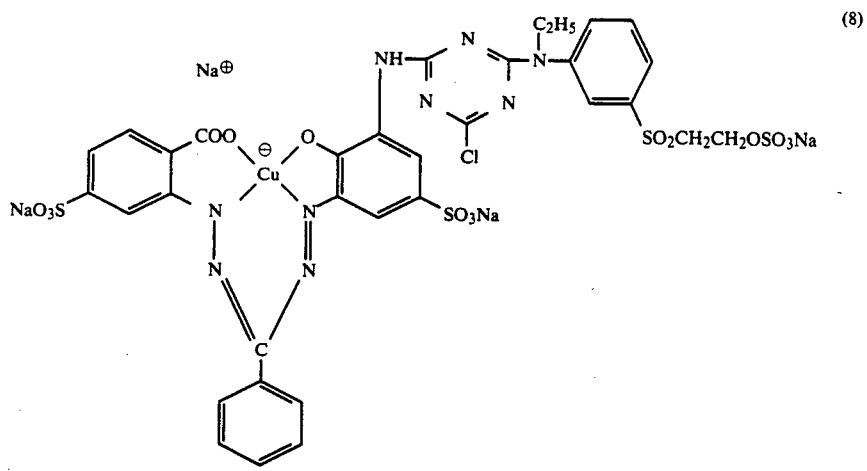

(8)

(dye content 93 parts).

The aqueous solution was mixed with potassium dihydrogenphosphate (14 parts), and then spray-dried to obtain a blue dye composition having an excellent storage stability.

EXAMPLE 9

2-Naphthylamine-4,8-disulfonic acid (15.2 parts) was diazotized in a conventional manner, followed by coupling with 1-naphthylamine-7-sulfonic acid (11.2 parts) at 15° C. or below and at pH 4 to 5. The resulting monoazo compound was again diazotized in a conventional manner, followed by coupling with 1-naphthylamine-8-sulfonic acid (11.2 parts) at 15° C. or below and at pH 4 to 5. After the diazonium compound disappeared, the reaction mixture was mixed with cyanuric chloride (9.3 parts) at 10° to 20° C. The mixture was kept for 3 hours at pH 6 to 7 using a 15% aqueous sodium carbonate solution. Then, 1-aminobenzene-3-β-sulfatoethylsulfone (14.1 parts) was added thereto, and the mixture as stirred for 5 hours at 40° to 50° C. and at pH 4.5 to 5.5, followed by salting out and filtration. The wet cake obtained (dye content 48 parts) was dissolved in water (500 parts), and the solution was mixed with sodium borate (12 parts), adjusted to pH 6 using 10% hydrochloric acid, and then spray-dried to obtain a brown dye composition containing a dye having the following formula (9), and having an excellent storage stability.

EXAMPLE 10

Cyanuric chloride (9.2 parts) was dispersed at 0° to 10° C. in a solution of a nonionic surfactant (0.1 part) in water (100 parts). To this dispersion was dropwise added a solution of sodium 2,4-diaminobenzenesulfonate in water (100 parts) at 0° to 5° C. taking over one hour.

Thereafter, a 20% aqueous sodium carbonate solution was added thereto to adjust the pH to 7 to 8. Sodium nitrite (3.5 parts) was added and dissolved therein, and then concentrated hydrochloric acid (12.7 parts) was added at 0° to 5° C. to effect diazotization. The diazonium dispersion thus obtained was added to a solution of 3-cyano-1-ethyl-6-hydroxy-4-methyl-2-pyridone (8.9 parts) in 1N sodium hydroxide solution (50 parts), and the mixture was mixed with sodium hydrogencarbonate (5 parts) and then stirred complete the coupling reaction.

Then, 1-aminobenzene-3-β-sulfatoethylsulfone (16.9 parts) was added thereto, and the mixture was heated to 40° C. while controlling the pH within 5 to 6, and stirred for 5 hours at that temperature. The reaction mixture was mixed with sodium chloride (60 parts) to deposit crystals, which were collected on a suction filter, washed and then dried at 60° C. to obtain a dye (31 parts) having the following formula (10).

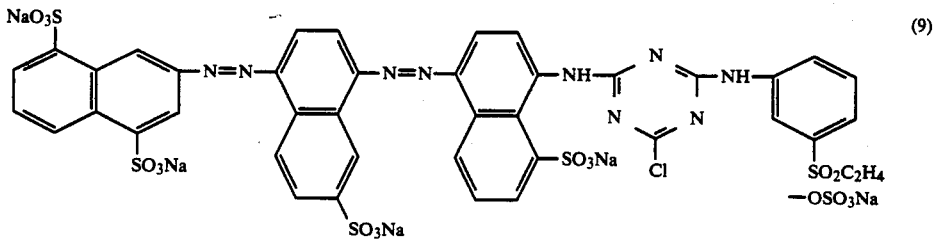

(9)

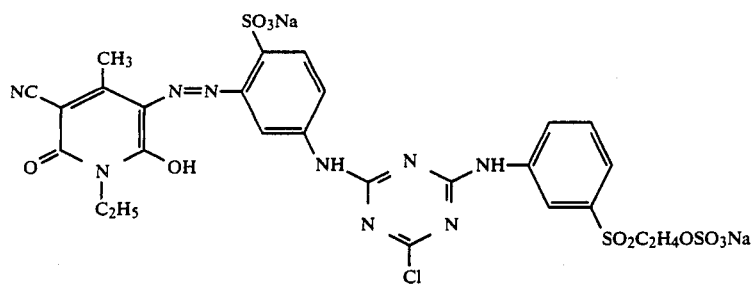

(10)

The dye obtained was uniformly blended with sodium dihydrogenphosphate (6 parts) to obtain a yellow dye composition having an excellent storage stability.

EXAMPLE 11

To a mixture of disodium 2-aminonaphthalene-3,6,8-trisulfonate (17 parts) with water (200 parts) was added sodium hydroxide solution to adjust the pH to 8, thereby forming a solution, sodium nitrite (2.8 parts) was added to the solution, and the mixture was cooled to 0° to 5° C. and then mixed with concentrated hydrochloric acid (12.2 parts). The mixture was stirred for one hour at that temperature. Excess nitrous acid present therein was decomposed, and a suspension of 3-aminophenylurea (6.1 parts) in water (150 parts) was added thereto. Successively, a 20% aqueous sodium carbonate solution was added to adjust the pH to 6 to 7, and the mixture was stirred for 5 hours at that temperature and pH.

Cyanuric chloride (7.4 parts) was added thereto, and the mixture was stirred for 3 hours, while controlling the pH within 6 to 7 using a 20% sodium carbonate solution. Thereafter, 1-amino-4-vinylsulfonylbenzene (7.3 parts) was added thereto, and the mixture was heated to 40° to 50° C., and stirred for 5 hours at this temperature, while controlling the pH within 6 to 7.

The reaction mixture was mixed with sodium chloride (50 parts) to deposit crystals, which were collected on a filter to obtain a wet cake containing a dye of the following formula (11), (dye content 28 parts).

The wet cake was mixed with water (300 parts) to form slurry. The slurry was mixed with sodium dihydrogenphosphate (1.7 parts), adjusted to pH 6.0, and then spray-dried to obtain a yellow dye composition having an excellent storage stability.

EXAMPLE 12

Cyanuric chloride (4.61 parts) and m-phenylenediaminesulfonic acid (4.70 parts) were mixed in an aqueous solution of a surfactant (50 parts), and the mixture was kept for 1 to 2 hours at 0° to 5° C. and at pH 1.5 to 3.0 to complete a first condensation. Successively, 1-aminobenzene-3-β-sulfatoethylsulfone (6.95 parts) was added to the first condensation mixture, and the mixture was stirred for 6 hours at 25° to 30° C., while controlling the pH within 5 to 5.5, to complete a second condensation.

To the condensation mixture were added ice (50 parts), concentrated hydrochloric acid (7.1 parts) and then a 35% sodium nitrite solution (5.3 parts) to effect diazotization. Excess nitrous acid was decomposed to obtain a diazonium liquor. To this liquor was added a neutral solution of 1-amino-8-hydroxynaphthalene-3,6-disulfonic acid (7.73 parts) at 0° to 10° C. taking over about 1 hour, and the mixture was stirred for several hours at pH 2.0 to 3.0 to complete the coupling. The reaction mixture was adjusted to pH 7 with a sodium hydroxide solution and then mixed with sodium chloride at 30° to 35° C. to obtain a monoazo dye-containing mixture.

On the other hand, a 35% sodium nitrite solution (5.1 parts) was introduced at 0° to 5° C. into a mixture of 2-aminonaphthalene-1,5-disulfonic acid (7.58 parts), water (160 parts), ice (40 parts) and concentrated hydrochloric acid (3.7 parts) to effect diazotization. Excess nitrous acid was dicomposed to obtain a diazonium liquor. The liquor was added at 5° to 10° C. to the above monoazo dye-containing mixture, which had been made alkaline with sodium hydrogencarbonate, and the mixture was stirred for 1 to 2 hours to complete the coupling reaction.

The resulting aqueous dye solution containing a dye having the following formula (12),

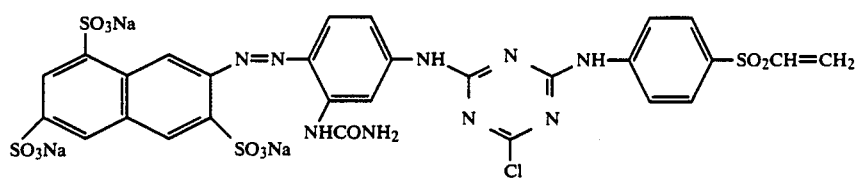

(11)

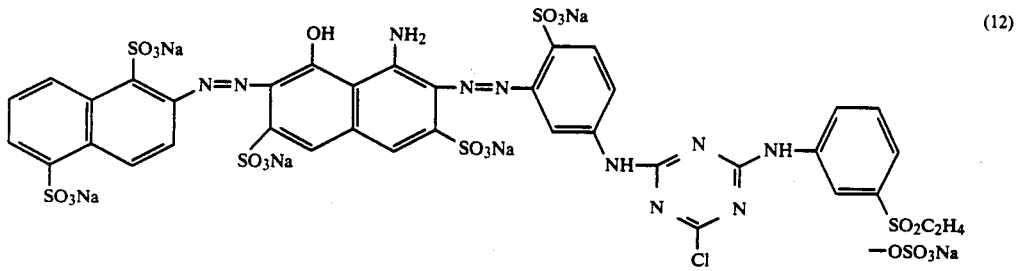

(12)

(dye content 29 parts) was mixed with sodium dihydrogenphosphate dihydrate (3.4 parts) and the mixture was adjusted to pH 5.3 with a 20% sodium carbonate solution and then spray-dried to obtain a navy blue dye composition having an excellent storage stability.

EXAMPLE 13

The dye composition obtained in Example 1 (0.3 part) was dissolved in water (150 parts), and sodium sulfate (30 parts) was incorporated thereinto to prepare a dye bath. Cotton (10 parts) was dipped thereinto, and the bath was heated to 60° C. 20 Minutes thereafter, sodium carbonate (4 parts) was added thereto, and the dyeing was continued for one hour at that temperature. Thereafter, the cotton as rinsed with water and soaped to obtain a dyed product of a levelling yellow color.

EXAMPLE 14

The dye composition obtained in Example 2 (0.3 part) was dissolved in water (200 parts), and sodium sulfate (30 parts) was incorporated thereto to prepare a dye bath. Cotton (10 parts) was dipped thereinto, and the bath was heated to 50° C. 20 Minutes thereafter, sodium carbonate (4 parts) was added thereto, and the dyeing was continued for one hour at that temperature. Thereafter, the cotton was rinsed with water and soaped to obtain a dyed product of a levelling red color.

EXAMPLE 15

A color paste having the following composition was prepared.

|  | Parts |
| --- | --- |
| Dye composition obtained in Example 3 | 5 |
| Urea | 5 |
| Thickener, sodium alginate (5%) | 50 |
| Hot water | 25 |
| Sodium hydrogencarbonate | 2 |
| Balance | 13 |

Mercerized cotton broad cloth was printed with the color paste, pre-dried and steamed for 5 minutes at 100° C. The cloth was rinsed with hot water, soaped, again rinsed with hot water and then dried to obtain a printed product of a brilliant yellow color.

EXAMPLE 16

The dye composition obtained in Example 4 (0.3 part) was dissolved in water (150 parts), and sodium sulfate (30 parts) was incorporated thereinto to prepare a dye bath cotton (10 parts) was dipped, and the bath was heated to 60° C. 20 Minutes thereafter, trisodium phosphate (3 parts) was added thereto, and the dyeing was continued for one hour at that temperature. The cotton was rinsed with water and soaped to obtain a dyed product of a red color.

EXAMPLE 17

The dye composition obtained in Example 5 (0.6 part) was dissolved in water (150 parts), and sodium sulfate (30 parts) was incorporated thereinto to prepare a dye bath. Cotton (10 parts) was dipped, and the bath was heated to 70° C. 20 Minutes thereafter, sodium carbonate (4 parts) was added thereto, and the dyeing was continued for 1 hour at that temperature. Thereafter, the cotton was rinsed with water and soaped to obtain a dyed product of a scarlet color.

EXAMPLE 18

A color paste having the following composition was prepared.

|  | Parts |
| --- | --- |
| Dye composition obtained in Example 6 | 4 |
| Urea | 5 |
| Thickener, sodium alginate (5%) | 50 |
| Hot water | 25 |
| Sodium hydrogencarbonate | 2 |
| Balance | 14 |

Mercerized cotton broad cloth was printed with the color paste, pre-dried and steamed for 5 minutes at 120° C. Then, the cloth was rinsed with hot water, soaped, again rinsed with water and dried to obtain a printed product of a brilliant blue color.

EXAMPLE 19

The dye composition obtained in Example 7 (0.3 part) was dissolved in water (150 parts), and sodium sulfate (20 parts) was incorporated thereinto to prepare a dye bath. Cotton (10 parts) was dipped and the bath was heated to 60° C. 30 Minutes thereafter, sodium carbonate (4 parts) was added thereto, and the dyeing was continued for one hour at that temperature. Thereafter, the cloth was rinsed with water and soaped to obtain a dyed product of a navy blue color.

EXAMPLE 20

The dye composition obtained in Example 8 (30 parts) was dissolved in water, and urea (100 parts), sodium m-nitrobenzenesulfonate (10 parts), sodium alginate (1 part) and sodium hydrogencarbonate (20 parts) were added thereto. Water was added to the mixture to make the whole 1000 parts by volume.

Cotton cloth was impregnated with the liquor prepared above, and press-squeezed up to 70% in pick-up. The cloth was hot-air-dried for 2 minutes at 120° C., steamed for 10 minutes at 100° C., and then rinsed with water and soaped to obtain a dyed product of a blue color.

EXAMPLE 21

The dye composition obtained in Example 9 (30 parts) were dissolved in water, and urea (100 parts), sodium m-nitrobenzenesulfonate (10 parts) and sodium alginate (1 part) were added to the solution. Water was added to the mixture to make the whole 1000 parts by volume.

Cotton cloth was impregnated with the liquor prepared above, and press-squeezed up to 70% in pick-up. Thereafter, the cloth was hot-air-dried for 2 minutes at 110° C., dipped for 15 seconds into 48° Be' sodium silicate solution heated to 95° C., then rinsed with water and soaped to obtain a dyed product of a reddish brown color.

EXAMPLE 22

The dye composition obtained in Example 10 (25 parts) was dissolved in water, and 33% sodium hydroxide solution (5.5 parts) and 50° Be' water glass (150 parts) were added to the solution. Water was added to the mixture to make the whole 1000 parts by volume.

Cotton cloth was impregnated with the liquor prepared above, and press-squeezed up to 60% in pick-up. The cloth was allowed to stand for 12 hours at ambient temperature, and then rinsed with water and soaped to obtain a dyed product of a yellow color.

EXAMPLE 23

The dye composition obtained in Example 11 (0.3 part) was dissolved in water (150 parts), and sodium sulfate (30 parts) was added to the solution to prepare a dye bath. Cotton (10 parts) was dipped therein and the bath was heated to 50° C. 20 Minutes thereafter, sodium carbonate (4 parts) was added thereto, and the dyeing was continued for one hour at that temperature. Thereafter, the cloth was rinsed with water and soaped to obtain a dyed product of a yellow color.

What is claimed is:

1. A reactive dye composition of improved storage stability comprising (1) a dye having the formula,

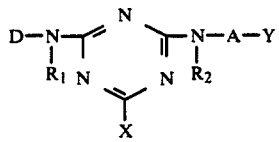

wherein D is an organic dye residue having at least one sulfo group, $R_1$ and $R_2$ are independently a hydrogen atom or an unsubstituted or substituted lower alkyl group, A is an unsubstituted or substituted phenylene or naphthylene group, X is a halogen atom, and Y is a substituent selected from the group consisting of $-SO_2CH=CH_2$ or $-SO_2CH_2CH_2Z$, in which Z is a group capable of being split by the action of an alkali, and (2) a buffer, the amount of the buffer being from 3 through 80% by weight based on the weight of the dye, and the pH value of an aqueous solution prepared from the dye composition and water of 20 times as much as the weight of the dye composition being from 3.5 through 7.5.

2. The composition according to claim 1, wherein the buffer is at least one member selected from sodium dihydrogenphosphate, disodium hydrogenphosphate, potassium dihydrogenphosphate, dipotassium hydrogenphosphate, sodium acetate, potassium acetate, sodium borate, potassium borate, sodium oxalate, potassium oxalate, and potassium hydrogenphthalate.

3. The composition according to claim 1, wherein the pH value is from 4.5 through 6.5.

4. The composition according to claim 1, wherein the amount of the buffer is from 5 through 50% by weight based on the weight of the dye.

5. The composition according to claim 1, wherein the composition further comprises an inorganic neutral salt and/or dispersing agent.

6. A process for producing a reactive dye composition of improved storage stability, which comprises mixing a dye of the following formula,

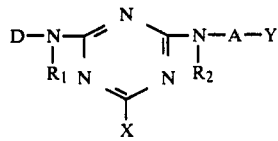

wherein D is an organic dye residue having at least one sulfo group, $R_1$ and $R_2$ are independently a hydrogen atom or an unsubstituted or substituted lower alkyl group, A is an unsubstituted or substituted phenylene or naphthylene group, X is a halogen atom, and Y is a substituent selected from the group consisting of $-SO_2CH=CH_2$ or $-SO_2CH_2CH_2Z$, in which Z is a group capable of being split by the action of an alkali, with a buffer of from 3 through 80% by weight based on the weight of the dye, and adjusting the pH of the composition in a manner such that the pH of an aqueous solution prepared from the dye composition and water of 20 times as much as the weight of the dye composition is made to from 3.5 through 7.5.

7. The process according to claim 6, wherein the mixing is carried out using the dye in the form of an aqueous solution, a slurry or a wet cake.

8. A process for dyeing or printing fiber materials, which comprises the materials with a reactive dye composition having improved storage stability comprising (1) a dye having the formula,

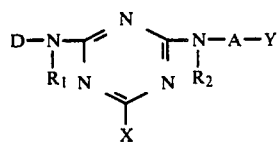

wherein D is an organic dye residue having at least one sulfo group, $R_1$ and $R_2$ are independently a hydrogen atom or an unsubstituted or substituted lower alkyl group, A is an unsubstituted or substituted phenylene or naphthylene group, X is a halogen atom, and Y is a substituent selected from the group consisting of $-SO_2CH=CH_2$ or $-SO_2CH_2CH_2Z$, in which Z is a group capable of being split by the action of an alkali, and (2) a buffer, the amount of the buffer being from 3 through 80% by weight based on the weight of the dye, and the pH value of an aqueous solution prepared from the dye composition and water of 20 times as much as the weight of the dye composition being from 3.5 through 7.5, at a temperature of 10° to 170° C. in the presence of an acid binding agent.

9. The process according to claim 8, wherein the fiber materials are hydroxyl group-containing fiber materials.

10. Fiber materials dyed or printed by the process of claim 8.

* * * * *